J. BRANDON.
COTTON GIN.
APPLICATION FILED SEPT. 9, 1909.
971,720.
Patented Oct. 4, 1910.
3 SHEETS—SHEET 1.
Fig. 1.
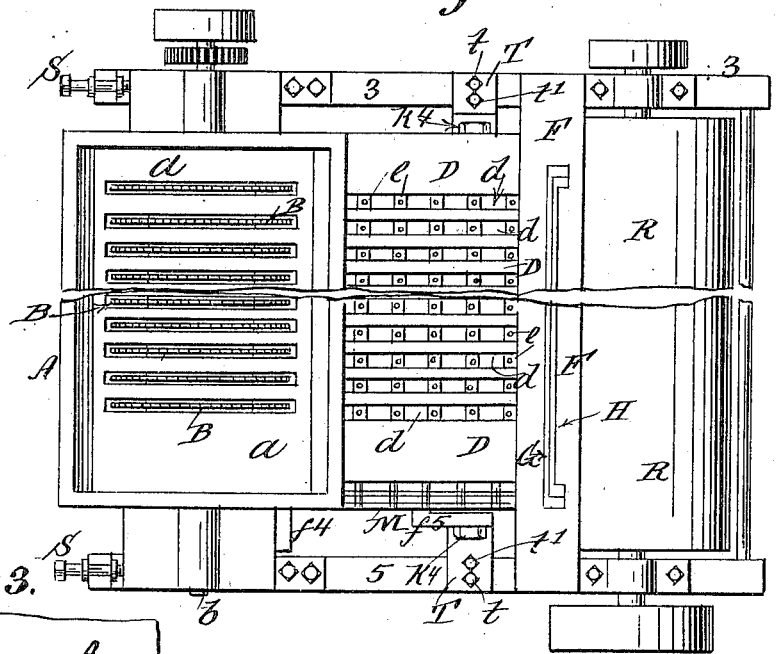
Fig. 3.
Fig. 2.
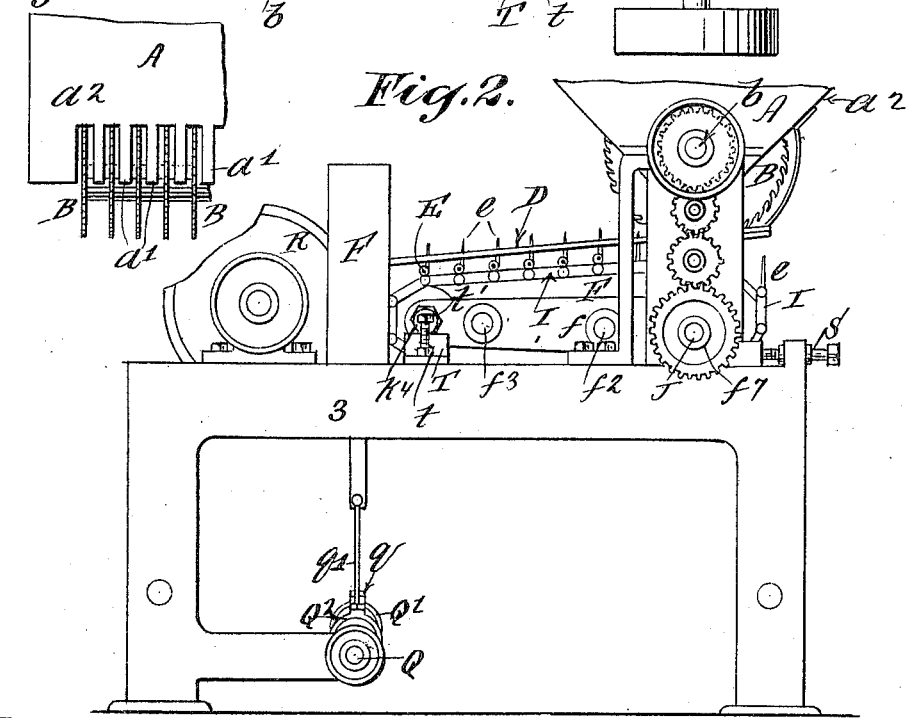
Witnesses:
O. W. Gardner.
A. E. Loucks Jr.
Inventor:
James Brandon
By his Attorney
Geo. Wm. Miatt

J. BRANDON.
COTTON GIN.
APPLICATION FILED SEPT. 9, 1909.

971,720.

Patented Oct. 4, 1910.

3 SHEETS—SHEET 2.

Witnesses:
D. W. Gardner
A. E. Loucks

Inventor:
James Brandon
By his Attorney
Geo. W. Miatt

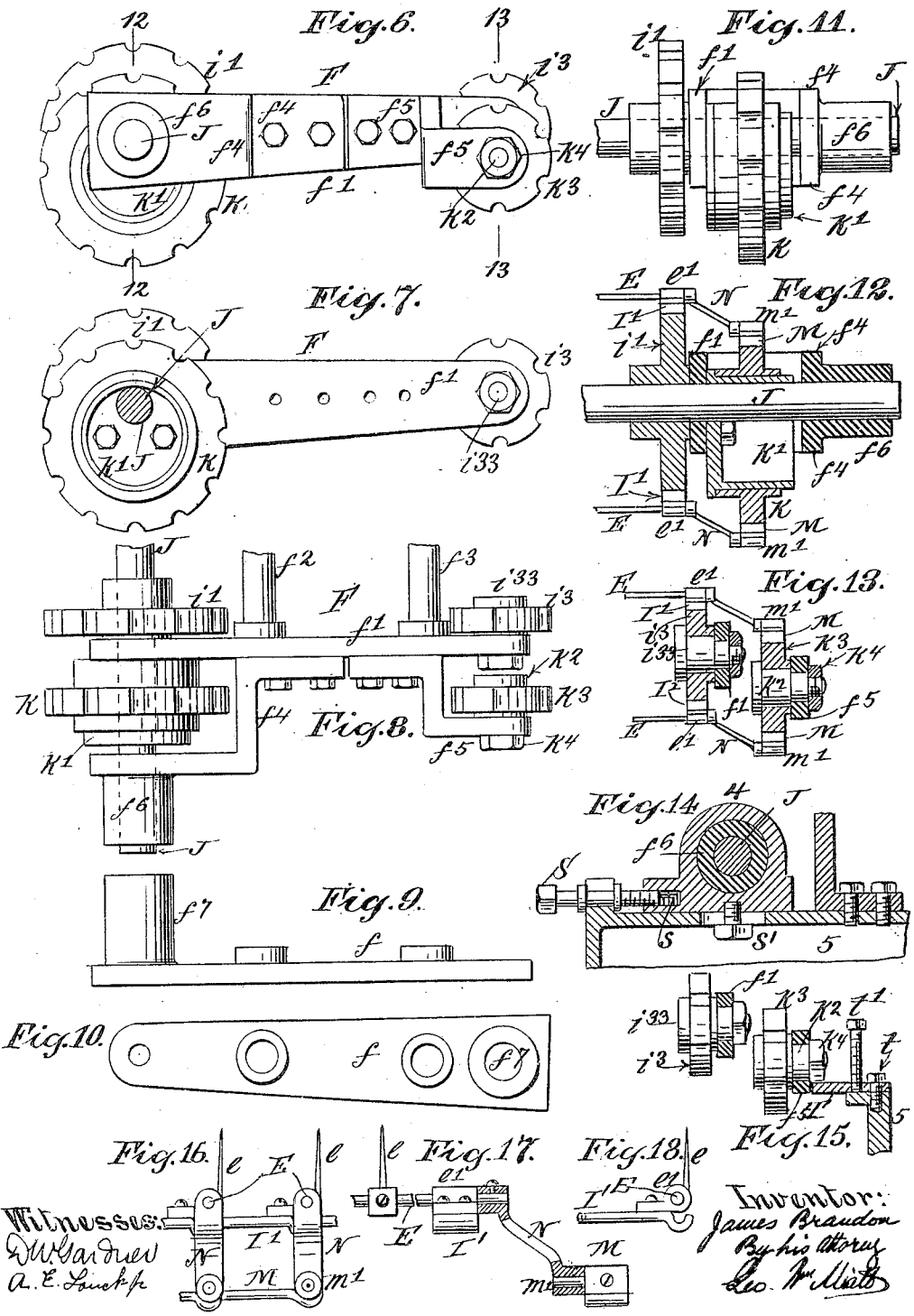

UNITED STATES PATENT OFFICE.

JAMES BRANDON, OF NEW YORK, N. Y.

COTTON-GIN.

971,720.  Specification of Letters Patent.  Patented Oct. 4, 1910.

Application filed September 9, 1909. Serial No. 516,836.

*To all whom it may concern:*

Be it known that I, JAMES BRANDON, a citizen of the United States, residing in the borough of Manhattan, city, county, and State of New York, have invented certain new and useful Improvements in Cotton-Gins, of which the following is a specification.

The object of my invention is to effectually open-up seed cotton so as to get rid of sand, grit, impurities and other extraneous matter before presenting the seed cotton to the ginning mechanism, so that the seed may be rapidly wiped out or separated from the loose lint by the stripping mechanism without strain or injury to the fiber, substantially as set forth in Patent No. 735,455 dated August 4, 1903.

Practical experience in the use of the apparatus has led to the present invention, which consists essentially in the specific construction and arrangement of parts described and claimed, whereby the apparatus may be made of any desired width and capacity, and whereby the feed mechanism may be adjusted both vertically and horizontally with relation to the stripping mechanism so as to attain accuracy and adapt the apparatus to the various grades of seed cotton to be treated substantially as hereinafter set forth.

Figure 4:
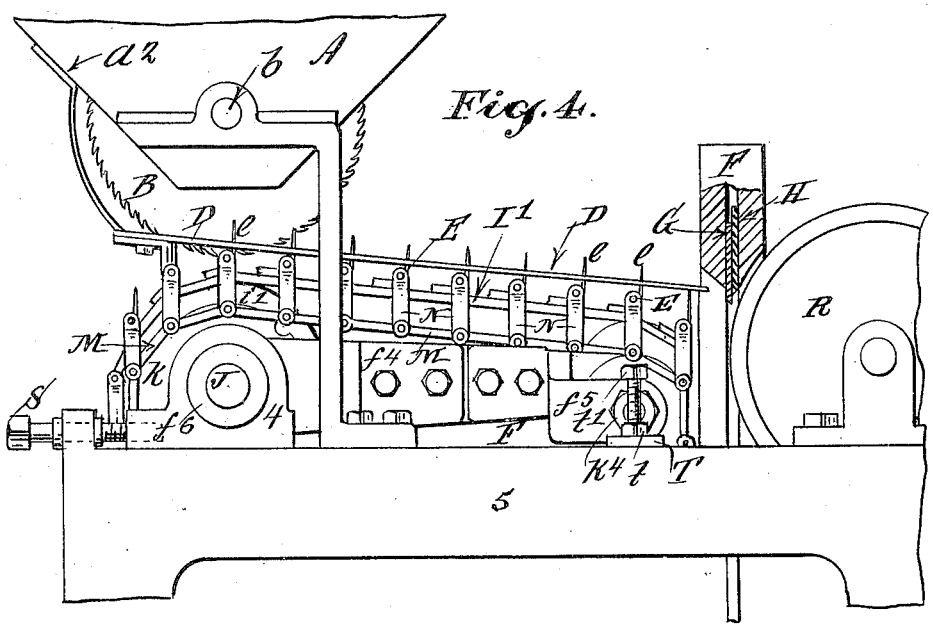
Figure 5:
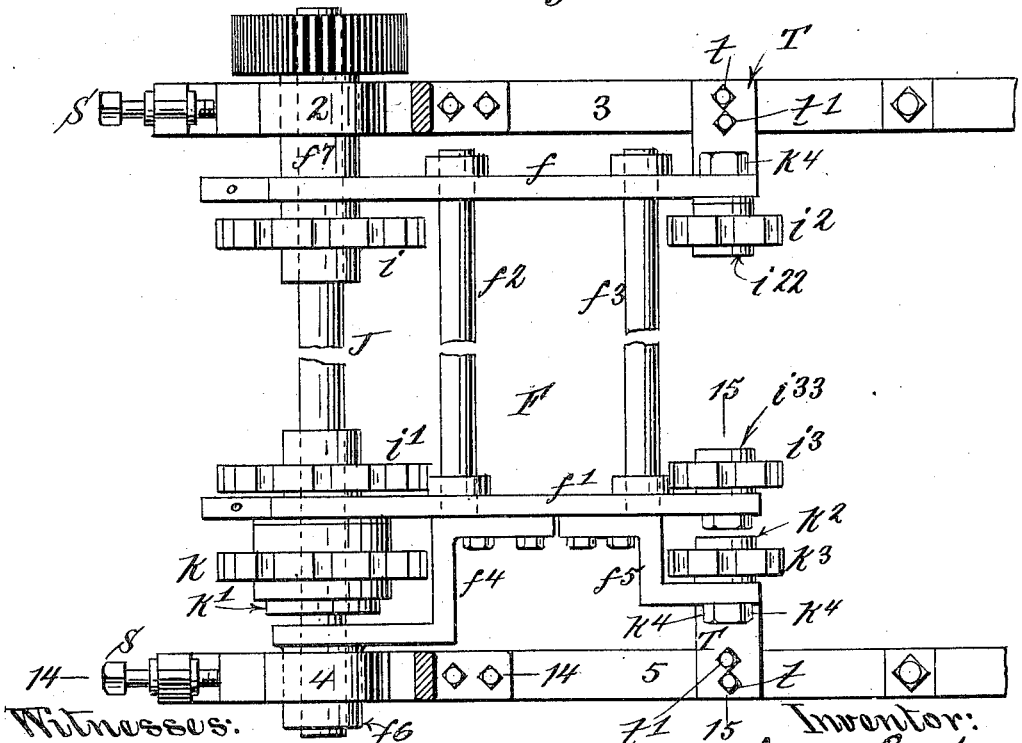

In the accompanying drawings, Figure 1, is a plan of my improved apparatus, partly broken away centrally; Fig. 2, is an elevation of the left hand side of the apparatus; Fig. 3, is an elevation of a part of the lower portion of the receiving hopper; Fig. 4, is a sectional elevation of the main parts of the apparatus, looking from the right hand side thereof; Fig. 5, is a plan of the parts upon and by which the feed mechanism is supported and actuated; Fig. 6, is an elevation of the right hand side of the feed mechanism supporting frame; Fig. 7, is a similar view with the brackets detached; Fig. 8, is a plan of the right hand side of the feed mechanism supporting frame, and attached parts; Fig. 9, is a top view of the left hand member of the feed mechanism supporting frame; Fig. 10, is a side elevation thereof; Fig. 11, is a front elevation of the parts shown in Fig. 8; Fig. 12, is a sectional elevation upon plane of line 12—12 Fig. 6; Fig. 13, is a sectional elevation upon plane of line 13—13 Fig. 6; Fig. 14, is a sectional elevation upon plane of line 14—14 Fig. 5; Fig. 15, is a sectional elevation upon plane of line 15—15 Fig. 5; Figs. 16, 17 and 18, are details of the feed mechanism.

The feed box or hopper A, is formed with a grating $a$, upon which the seed-cotton is deposited. Between the bars of this grate $a$, project the upper portions of the saws B, mounted upon the shaft $b$. Tongues $a'$, formed on the wall $a^2$, of the hopper A, project downward between the saws, forming slots through which the seed-cotton is withdrawn from the hopper similar to the manner in which seed-cotton is treated in the older forms of cotton-gins, with this exception, however, that whereas in the old form of saw-gin the slots through which the saws protruded are not wide enough to allow the cotton-seed to pass, in the present case they are purposely made of sufficient width to allow the seeds in the boll to pass freely, the tongues $a'$, acting not as seed-eliminators, but simply to retard and open up the cotton bolls as they are withdrawn by the saws from the feed-box A.

The seed-cotton is carried by the saws B, to the feed board or table D, formed with a series of longitudinal slots $d$, through which project forwarding-fingers $e$, $e$, which travel toward the breast F and stripper-blades G, H, at a speed slightly greater than the peripheral speed of the saws B, so that the fingers $e$, $e$, in taking the cotton from the saws open up and attenuate the bolls still further. This result is supplemented and augmented by the resistance afforded by the frictional contact of the seed-cotton with the table D as it draws over the fingers $e$, $e$, which thus continue to open out the fiber until the cotton reaches the breast and stripper blades, the fingers $e$, $e$, being sufficiently far apart to insure looseness and freedom of fiber.

The feed-fingers $e$, $e$, are attached rigidly to transverse rods E, E, mounted upon and between parallel endless chains I, I', passing over sprocket wheels $i$, $i'$, and idlers $i^2$, $i^3$. The sprocket wheels $i$, $i'$, are rigidly secured to a shaft J, which is supported indirectly in the bearing 2 on the left hand side standard 3, and in the bearing 4 on the right hand side standard 5. The idlers $i^2$, $i^3$, are mounted on studs $i^{22}$ and $i^{33}$, on the inner free end of a frame F, which is pivotally supported upon the shaft J. The frame F is composed of side members $f$, $f'$, and cross members $f^2$, and $f^3$, together with the brackets $f^4$ and $f^5$, secured to the side member $f'$, the bracket $f^5$ being formed with a hub $f^6$, which rests directly in the bearing 4, a corresponding hub $f^7$, on the side member $f$, resting in the bearing 2, and the power shaft J being journaled in these hubs $f^6$, and $f^7$, as indicated in dotted lines in Fig. 5. It will thus be seen that the frame F is fulcrumed on the power shaft J, and may be swung thereon to adjust its inner free end.

The bearings 2 and 4 are made adjustable horizontally by any suitable means. As shown in the drawings, particularly in Fig. 14, this adjustment is effected by means of screws S, journaled in the front ends of the standards 3 and 5, the inner ends of these screws engaging with female screw threads $s$, formed for their reception in the bearings 2 and 4, and the underlying flange of each standard 3 and 5 being slotted to admit a binding screw $s'$, by which the bearing is rigidly secured in a prescribed position after adjustment.

$k$, is a sprocket wheel of the same diameter as the sprocket wheels $i$ and $i'$, but supported on a hollow hub $k'$ which is below and eccentric to the axis of the shaft J. In the drawings this hub $k'$ is shown as bolted to the side member $f'$ of the frame F (see particularly Figs. 7 and 12). This sprocket wheel $k$ is an idler running loosely on the hub $k'$. In line with it and supported on a stud $k^2$ on the bracket $f^5$ is an idler sprocket $k^3$, of the same diameter as the sprockets $i^2$ and $i^3$, its axis of rotation being below and eccentric to that of said sprockets $i^2$, $i^3$, a distance equal to that between the axis of the power shaft J, and the hub $k'$.

M is an auxiliary endless sprocket chain passing over the idler sprockets $k$ and $k^3$.

In order to avoid injury to the cotton fiber, I cause my forwarding fingers $e$, to enter and leave the seed cotton upon the table at substantially right angles to the latter.

The rods E, are mounted loosely in bearings $e'$, attached to corresponding links of the endless chains I, I', so that said rods will be free to turn upon their longitudinal axes were they not otherwise held by the controlling arms N, in such manner that in reality the bearings $e'$, may be said to be free to turn upon the rods E. The controlling arms N are rigidly attached to each finger rod, the lower end of the controlling arms being pivotally connected with one of the bearings $m'$, on the endless auxiliary chain M. It is to be noted in this connection that the sprocket wheels $k$, $k^3$, supporting the auxiliary chain M, are below the carrier sprocket wheels $i'$, $i^3$. It will thus be seen that the controlling arms N, being rigidly attached to the finger rod E, and pivotally attached to the endless auxiliary chain M, will hold the fingers $e$, in the same prescribed positions, throughout their endless journey, preferably a position approximately or substantially at right angles to the feed table D, as shown in the drawings. I have found by actual experience that it is not necessary to apply power directly to the auxiliary chain M, or idlers $k$, $k^3$, the frictional resistance afforded to their movement by reason of their pivotal connection with the arms N, being so slight as not to interfere with or retard the action of the chain I' and connections. In fact the auxiliary chain M, is designed to act simply as a parallel drag to maintain the arms N, finger rods E and forwarding fingers $e$, constantly at a prescribed angle with relation to the feed table D. As a result the said fingers $e$, enter and leave the seed cotton gently, without tearing, twisting, or snarling the same. This feature is of especial importance at the end of the feed where the seed cotton is delivered to the stripping mechanism, since the fingers $e$, sink below the table and away from the cotton without straining, breaking or tearing the latter, as they would inevitably do were they to pass around the idlers in a radial position. As thus fed to the ginning and stripping mechanism, the bolls of seed cotton are in the form of loosely attenuated slivers, from which the seed can be readily extracted without injury to the cotton fiber.

My cotton-boll opening and feeding mechanism may obviously be employed in connection with various forms of stripping or ginning devices, and I do not limit or restrict myself in this respect, although I herein show a specific form of stripping mechanism which is especially adapted for use in this connection. This seed-extracting mechanism consists, essentially, of two stripper-plates, G, H, sliding one over the other and supported in a suitable frame or breast F. These plates G, H, are made to reciprocate simultaneously in opposite directions through the medium of rods as in my Letters Patent No. 735,455 hereinbefore referred to, by means of eccentrics Q', Q², on a power-shaft Q. They are so arranged that their lower edges vibrate between the inner edge of the feed-table D and the ginning roller R, so that as the slivers are drawn by the ginning-roller from the feed-table D, the seeds are literally knocked down and out of the cotton fiber by blows delivered, substantially, at right angles to the line of feed. Thus the function of the vibrating plates is simply to extricate and eliminate the seed from the fiber, and they are not relied upon to open up and disintegrate the seed cotton-bolls, as heretofore.

The seed-cotton is usually fed to the ginning device in a more or less matted compact mass, which has to be opened up and literally torn apart by the ginning mechanism before the latter can extract the seed, resulting in serious injury to the fiber and the clogging of the apparatus to such an extent that it has to be stopped frequently and cleared. In my apparatus clogging is practically impossible, since the cotton-bolls are opened up and combed out into comparatively thin attenuated slivers in which the fibers are elongated and parallel to each other, the seed being loosened from the fiber to such an extent that it is wiped out by the stripping mechanism without tangling or straining the fiber. As a result a higher, more uniform, and valuable grade of cotton is attained continuously and rapidly as compared with the prior state of the art, the output being more than doubled for a given size of apparatus. In thus opening up the cotton-bolls and combing out the fiber as a preliminary to subjecting the seed-cotton to the action of the stripping mechanism I also eliminate sand and other heavy material that would otherwise tend to injure the fiber during the wiping out of the seed as well as impair its quality. The opening up of the cotton-bolls by the saws and intervening tongues without extracting the seed from the cotton as it passes from the hopper, prepares the seed-cotton for the combing action of the forwarding-fingers, so contributing materially to the elimination of the seed without injury to the cotton.

I have found by actual experience that in order to attain the best results and adapt my aparatus effectually to the treatment of seed-cotton of various grades that the accurate adjustment of the feed mechanism with relation to the stripping mechanism is of the utmost importance, and for this reason I have constructed my present apparatus with means for adjusting the feed mechanism both horizontally and vertically with relation to the stripping mechanism. The horizontal adjustment is effected by adjusting the power shaft J, by means of the screws S, as hereinbefore set forth. The vertical adjustment of the feed mechanism with relation to the stripping mechanism, is effected by means of bearing plates T, on either side of the apparatus and upon which the inner free ends of the members $f$, $f'$, of the frame F, are supported either directly or what amounts to the same thing, through the medium of the nuts $k^4$ as shown in the drawings. These bearing plates T, are made adjustable upon the standards 3 and 5 by the use of any suitable mechanical expedient. As shown in the drawings the plates T are held down by binding screws $t$, acting against the adjusting screws $t'$. When it is desired to effect the adjustment of a bearing plate T, a binding screw $t$ is loosened, the adjusting screw $t'$, turned to the right or left to raise or lower the plate T, as may be desired, and the binding screw $t$, re-tightened to lock the parts in position. This will be understood by reference to Fig. 15.

By my present construction in which the power shaft J extends between and is supported by both of the side standards 3 and 5, I am enabled to make the apparatus practically of any width desired, as may be found most expedient, whereas in my patent hereinbefore referred to the width of the machine was necessarily prescribed within certain limits by reason of the fact that the shaft J, was supported on one side standard only. This desirable result I accomplish by means of the hub $k'$, arranged eccentric to the power shaft J, as will be understood more particularly by reference to Figs. 7 and 12 and also by arranging the sprockets $i^3$ and $k^3$ eccentrically, whereby, as shown in Figs. 12, 13, the controlling arms N, have full clearance at both bights or turns of the sprocket chain I', and auxiliary chain M.

By my method of opening up and attenuating the boll of cotton preparatory to subjecting it to the action of the stripping mechanism I avoid all danger of sparking or combustion by reason of the contact of the strippers with flinty or metallic substances in the seed-cotton as heretofore treated, since flinty and other foreign substances are eliminated by gravity as the seed-cotton is opened up and drawn over the feed-table by my improved automatic feed.

What I claim as my invention and desire to secure by Letters Patent is,

1. In cotton-ginning apparatus, the combination of a receiving-hopper formed with a series of slots of greater width than the cotton-seed, a series of saws arranged to remove the seed-cotton through said slots and deposit it on a feed-board, said feed-board formed with a series of longitudinal slots, a series of forwarding-fingers projecting through said slots, and mechanism for carrying said forwarding-fingers and maintaining them in positions parallel to each other and substantially at right angles to the feed-board, seed stripping mechanism arranged at the end of the feed board, and means for adjusting the mechanism carrying the forwarding fingers vertically with relation to the stripping mechanism, substantially in the manner and for the purpose described.

2. In cotton-ginning apparatus, the combination of a receiving-hopper formed with a series of slots of greater width than the cotton-seed, a series of saws arranged to remove the seed-cotton through said slots and deposit it on a feed-board, said feed-board formed with a series of longitudinal slots, a series of forwarding fingers projecting through said slots, and mechanism for carrying said forwarding-fingers and maintaining them in positions parallel to each other and substantially at right angles to the feed board, seed stripping mechanism arranged at the end of the feed board, and means for adjusting the mechanism carrying the forwarding fingers horizontally with relation to the stripping mechanism, substantially in the manner and for the purpose set forth.

3. In cotton-ginning apparatus, the combination of a receiving-hopper formed with a series of slots of greater width than the cotton-seed, a series of saws arranged to remove the seed-cotton through said slots and deposit it on a feed-board, said feed-board formed with a series of longitudinal slots, a series of forwarding-fingers projecting through said slots, and mechanism for carrying said forwarding-fingers and maintaining them in positions parallel to each other and substantially at right angles to the feed board, seed stripping mechanism arranged at the end of the feed board, and means for adjusting the mechanism carrying the forwarding-fingers both vertically and horizontally with relation to the stripping mechanism, substantially in the manner and for the purpose set forth.

4. In cotton-ginning apparatus, the combination of a receiving-hopper formed with a series of slots of greater width than the cotton-seed, a series of saws arranged to remove the seed-cotton through said slots and deposit it on a feed board, said feed-board formed with a series of longitudinal slots, forwarding mechanism consisting of a series of forwarding-fingers projecting through said slots and rigidly attached to transverse bars, said transverse bars pivotally connected to a forwarding chain, said forwarding chain, a series of controlling arms rigidly attached to said transverse finger carrying bars and pivotally connected to an auxiliary endless chain, said auxiliary endless chain arranged parallel to but lower than the aforesaid endless forwarding chain, a frame on which said forwarding mechanism is mounted, said frame being pivotally supported upon the power shaft, for the purpose described, and seed stripping mechanism arranged at the end of the feed board, substantially in the manner and for the purpose described.

5. In cotton-ginning apparatus, the combination of a receiving-hopper formed with a series of slots of greater width than the cotton-seed, a series of saws arranged to remove the seed-cotton through said slots and deposit it on a feed board, said feed-board formed with a series of longitudinal slots, forwarding mechanism consisting of a series of forwarding fingers projecting through said slots and rigidly attached to transverse bars, said transverse bars pivotally connected to a forwarding chain, said forwarding chain, a series of controlling arms rigidly attached to said transverse finger carrying bars and pivotally connected to an auxiliary endless chain, said auxiliary endless chain arranged parallel to but lower than the aforesaid endless forwarding chain, a frame on which said forwarding mechanism is mounted, said frame being pivotally supported at its forward end upon the power shaft and at its free inner end upon bearings which are vertically adjustable, and seed stripping mechanism arranged at the end of the feed-board substantially in the manner and for the purpose set forth.

6. In cotton-ginning apparatus, the combination of a receiving-hopper formed with a series of slots of greater width than the cotton-seed, a series of saws arranged to remove the seed-cotton through said slots and deposit it on the feed-board, said feed board formed with a series of longitudinal slots, forwarding mechanism consisting of a series of forwarding fingers projecting through said slots and rigidly attached to transverse bars, said transverse bars pivotally connected to a forwarding chain, said forwarding chain, a series of controlling arms rigidly attached to said transverse finger carrying bars and pivotally connected to an endless chain, said auxiliary chain arranged parallel to but lower than the endless forwarding chain, upon sprocket wheels which are eccentric to the sprocket wheels supporting the forwarding chain, said sprocket wheels, a frame on which said forwarding mechanism is mounted said frame being pivotally supported at its forward end upon the power shaft and at its free inner end upon bearings which are vertically adjustable said power shaft mounted in bearings on standards on opposite sides of the feed mechanism, and seed stripping mechanism arranged at the end of the feed-board substantially in the manner and for the purpose described.

JAMES BRANDON.

Witnesses:
D. W. GARDNER,
GEO. WM. MIATT.